United States Patent
Bhimani et al.

(10) Patent No.: US 12,017,592 B2
(45) Date of Patent: Jun. 25, 2024

(54) POWERTRAIN CONTROL SYSTEM WITH STATE OF HEALTH INFORMATION

(71) Applicant: VOLKSWAGEN AKTIENGESELLSCHAFT, Wolfsburg (DE)

(72) Inventors: Mohak Prafulkumar Bhimani, Sunnyvale, CA (US); Elnaz Vahedforough, San Jose, CA (US); Melanie Senn, Mountain View, CA (US); Ulrich Maehr, Redwood City, CA (US)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 344 days.

(21) Appl. No.: 17/137,118

(22) Filed: Dec. 29, 2020

(65) Prior Publication Data
US 2022/0203908 A1 Jun. 30, 2022

(51) Int. Cl.
*B60R 16/023* (2006.01)
*G05B 13/02* (2006.01)
*G07C 5/08* (2006.01)
*B60K 6/22* (2007.10)

(52) U.S. Cl.
CPC ...... *B60R 16/0232* (2013.01); *G05B 13/0265* (2013.01); *G07C 5/0808* (2013.01); *B60K 6/22* (2013.01); *B60Y 2200/92* (2013.01)

(58) Field of Classification Search
CPC ............ B60R 16/0232; G05B 13/0265; G07C 5/0808; B60K 6/22; B60Y 2200/92; B60L 2240/12; B60L 2240/545; B60L 2240/547; B60L 2240/622; B60L 2240/662; B60L 2240/667; B60L 2260/46; B60L 3/12; B60L 15/2045; B60L 58/16; B60L 58/40; B60W 2420/408; B60W 2420/403; B60W 2520/06; B60W 2520/10; B60W 2720/40; B60W 2756/10; B60W 10/02; B60W 10/06; B60W 10/08; B60W 10/24; B60W 10/26; B60W 20/11; B60W 20/12; B60W 20/13;
(Continued)

(56) References Cited

U.S. PATENT DOCUMENTS

2005/0137764 A1* 6/2005 Alvarez-Troncoso ...................... B60W 20/11
701/1
2020/0081070 A1* 3/2020 Chemali ............. H01M 10/425

FOREIGN PATENT DOCUMENTS

WO WO-2020096618 A1 * 5/2020 ............ B60W 10/06

OTHER PUBLICATIONS

L. Vichard, F. Harel, A. Ravey, P. Venet, D. Hissel, Degradation prediction of PEM fuel cell based on artificial intelligence, International Journal of Hydrogen Energy, vol. 45, Issue 29, (Year: 2020).*

* cited by examiner

*Primary Examiner* — Elim Ortiz

(57) ABSTRACT

A powertrain system may determine a power distribution for a set of power sources of a vehicle. The powertrain system may be coupled to a perception system that may provide perception data indicating a scenario, situation, or environment that has been encountered by the vehicle. The powertrain system may also receive health values. The powertrain system may include machine learning model that may generate the power distribution based on one or more of the perception data, the health values, and a power request.

20 Claims, 7 Drawing Sheets

(58) Field of Classification Search
CPC ............ B60W 20/14; B60W 50/0097; B60W 60/001; B60W 60/0023
See application file for complete search history.

POWERTRAIN CONTROL SYSTEM WITH STATE OF HEALTH INFORMATION

TECHNICAL FIELD

Embodiments of the present disclosure relate generally to powertrain systems. More particularly, embodiments of the disclosure relate to powertrain systems for vehicles using perception sensing to provide vehicle powertrain modes.

BACKGROUND

A vehicle may include one or more power sources that may be used to generate/provide power to move the vehicle. For example, a vehicle may include fuel (e.g., gasoline) for an internal combustion engine (ICE), a fuel cell, a battery etc., which may be used to generate power for moving the vehicle. The power generated by the one or more power sources may be used to operate components of the vehicle, such as a transmission, drive shafts, differentials, wheels, an electric motor, etc. A hybrid vehicle may be a vehicle that uses two or more different power sources. For example, a hybrid vehicle may use an ICE (e.g., a first power source) and an electric motor (e.g., a second power source) to generate power for moving the hybrid vehicle. In another example, a hybrid vehicle may use a fuel cell (e.g., a first power source) and a battery (e.g., a second power source) to generate power for moving the hybrid vehicle. A vehicle may also include a powertrain system that may be used to control the power sources in the vehicles. The powertrain system may determine how much power should be generated by each power source. The powertrain system may cause, instruct, etc., each power source to generate the appropriate amount of power for moving the vehicle. For example, the powertrain may instruct a first power source to generate a first amount of power and may instruct a second power source to generate a second amount of power.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
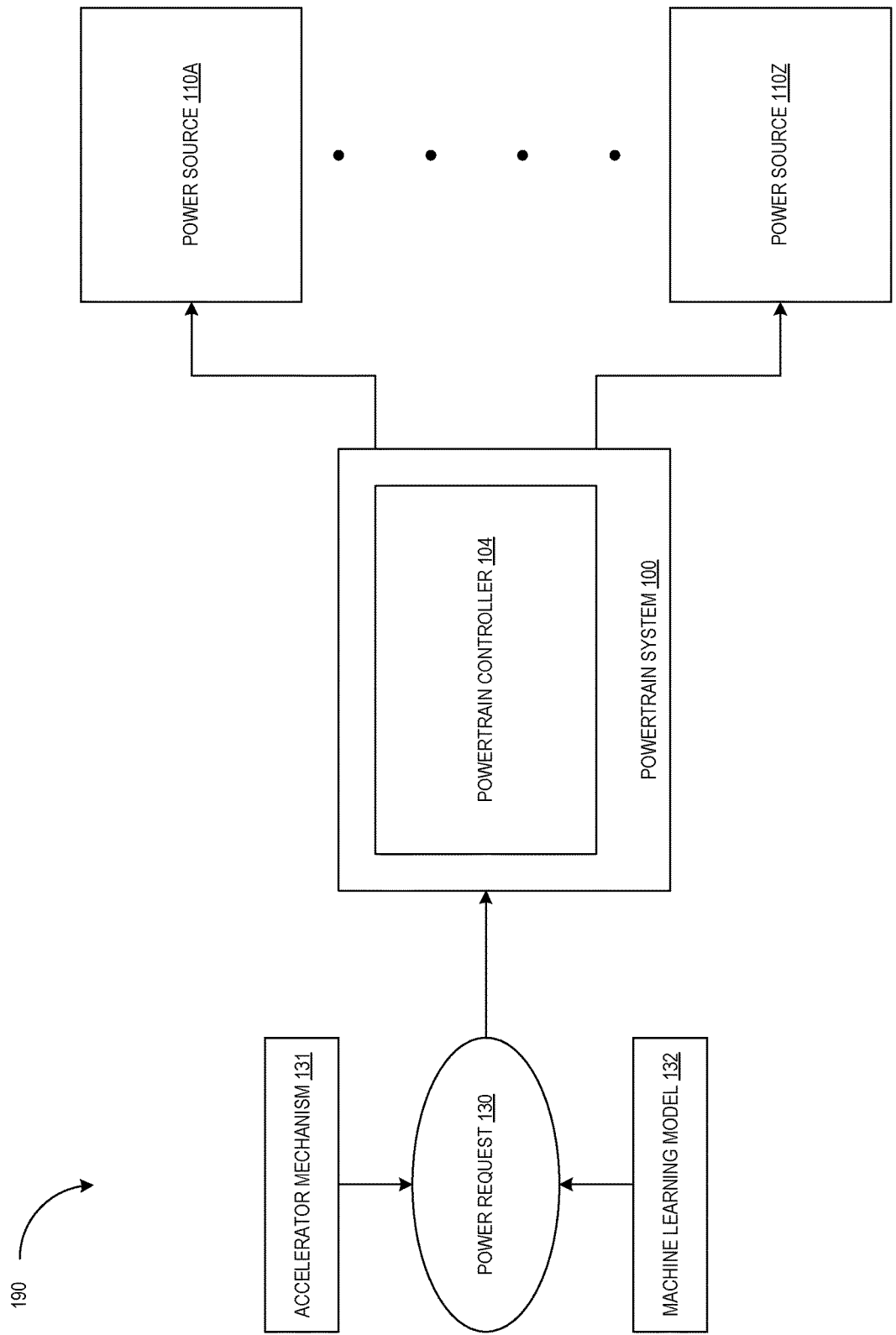
FIG. 1 is a block diagram illustrating an example powertrain system, in accordance with one or more embodiments of the present disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As discussed above, a vehicle may include one or more power sources that may be used to generate/provide power to move the vehicle. The power generated/provided by the one or more power sources may be used to operate components of the vehicle, such as a transmission, drive shafts, differentials, wheels, an electric motor, etc. A hybrid vehicle may use two or more different power sources. A vehicle may also include a powertrain system that may be used to control the power sources in the vehicles. The powertrain system may determine a power distribution that may indicate how much power should be generated by each power source.

Generally, a powertrain system may use a rule-based system to determine the power distribution to use. The power distribution selected by a rule-based system may not be the most efficient manner to meet the demand/request for power (e.g., may not minimize or reduce the amount of power used by the vehicle) because the rule-based system may not be able to account for the scenarios, situations, environments, etc., that may be encountered by the vehicle. For example, the rule-based system may include a list or table of static rules that were pre-generated. If the vehicle encounters a scenario that was not previously considered, the static rules may not be able to provide power distribution that minimizes or reduce the amount of power needed by the vehicle. It may be impossible, too complex, or too resource intensive to generate rules that cover all possible scenarios, environments, etc., that may be encountered by the vehicle.

In addition, vehicles, including ICE vehicles, battery electric vehicles, fuel cell powered vehicles, and hybrid vehicles thereof, rely solely on look-up tables to provide a power distribution based on a driver's application on an accelerator pedal of the vehicle.

The embodiments, examples, and implementations provided herein may use a machine learning model to determine a power distribution for the power sources of the vehicle. The machine learning model may be able to use perception data that indicates the scenario, situation, and/or environment that a vehicle has encountered. This allows the machine learning model to generate different power distributions which may be power efficient for different scenarios. In addition, the machine learning model may be able to generate the power distribution as quickly, if not quicker, than a rule-based system. Also, the machine learning model may be able to generate continuous power distributions from arbitrary scenarios and vehicle states to generalize on previously unseen/unknown data by nonlinear interpolation.

FIG. 1 is a block diagram illustrating an example powertrain system 100, in accordance with one or more embodiments of the present disclosure. The powertrain system 100 may be communicatively coupled to power sources 110A through 110Z. The powertrain system 100, and the power sources 110A through 110Z may be part of a vehicle 190. Vehicle 190 may be an autonomous vehicle, a semi-autonomous vehicle, a non-autonomous vehicle, a car, a truck, a van, etc. The power sources 110A through 110Z may be different types and/or sources of power for the vehicle 190. For example, power source 110A may be fuel for an internal combustion engine (ICE), power source 110B may be a fuel cell, and power source 110C may be a battery etc., which may be used to generate power for moving the vehicle. The power generated/provided by the power sources 110A through 110Z may be used to operate/power components of the vehicle 190 that may be used to move the vehicle 190. Examples of such components include, but are not limited to, a transmission, drive shafts, differentials, gears, a final drive, wheels, an electric motor, etc. The powertrain system 100 may include the various components that are used to move the vehicle 190. The vehicle 190 may be a hybrid vehicle because the vehicle 190 includes different types and/or sources of power (e.g., power sources 110A through 110Z).

In one embodiment, the powertrain system 100 may receive a power request 130. The power request 130 may indicate the amount of power that is being requested for moving the vehicle 190. For example, if a user (e.g., a driver) wants to accelerate the vehicle 190, power request for a certain amount of power may be provided to the powertrain system 100. The power request 130 may indicate the amount of power requested in various units, included but not limited to horse power, torque, newton meters, watts, etc.

In one embodiment, the power request 130 may be determined, obtain generated, etc., based on a user input (e.g., input received from a driver) via an accelerator mechanism 131. For example, a driver may push on a gas/accelerator pedal (e.g., an accelerator mechanism) to request more power from one or more of the power sources 110A through 110Z. The distance that the gas/accelerator pedal is depressed may indicate the amount of power requested by the driver. Other types of mechanisms may be used by a user to request power. For example, buttons for cruise control systems, paddles, switches, dials, etc., may be used by a driver to indicate an amount of power for the power request 130.

In one embodiment, the power request 130 may be determined obtained, generated, etc., based on a machine learning model 132. The machine learning model 132 may allow the vehicle 190 to operate via driver control as well as autonomously and/or semi-autonomously. For example, the machine learning model 132 may generate inferences, actions, decisions, etc., based on data that is received from various devices (e.g., sensor devices) as discussed in more detail below. For example, the machine learning model 223 may be used to detect objects (e.g., pedestrians, other vehicles), predict a behavior of the pedestrian (e.g., predict a direction of movement of the pedestrian), determine a path through an environment that avoids the objects, increase/decrease the speed of the vehicle, etc. Based on the objects detected by the machine learning model 223, the machine learning model 132 may determine that the vehicle 190 should accelerate (e.g., accelerate to pass another vehicle) to a certain speed. The machine learning model 132 may generate the power request 130 to request the additional power from one or more of the power sources 110A through 110Z to accelerate to the certain speed.

In one embodiment, the powertrain system 100 includes a powertrain controller 104. The powertrain controller 104 may determine a power distribution based on the power request 130. As discussed above, each of the power sources 110A through 110Z may be used to operate/power components of the vehicle 190 (e.g., transmission, an electric motor) which move the vehicle 190. The powertrain controller 104 may use different power sources 110A through 110Z to provide the amount of power indicated in the power request 130. For example, if the power request 130 indicates 1000 watts of power, the powertrain controller 104 may use power source 110A to generate/provide 200 watts of power and power source 110B to generate/provide 800 watts of power. For example, the powertrain controller 104 may control or instruct the powers sources 110A through 110Z to generate/provide certain amounts of power. The total amount of power requested/indicated in the power request 130 may be divided by the powertrain controller 104 among the power sources 110A through 110Z in any combination.

As discussed above, the powertrain system 100 may use a rule-based system to determine the power distribution to use. The power distribution selected by a rule-based system may not be the most power efficient because the rule-based system may not be able to account for the scenarios, situations, environments, etc., that may be encountered by the vehicle. Thus, the vehicle may not be able to operate with optimal power efficiency.

Figure 2:
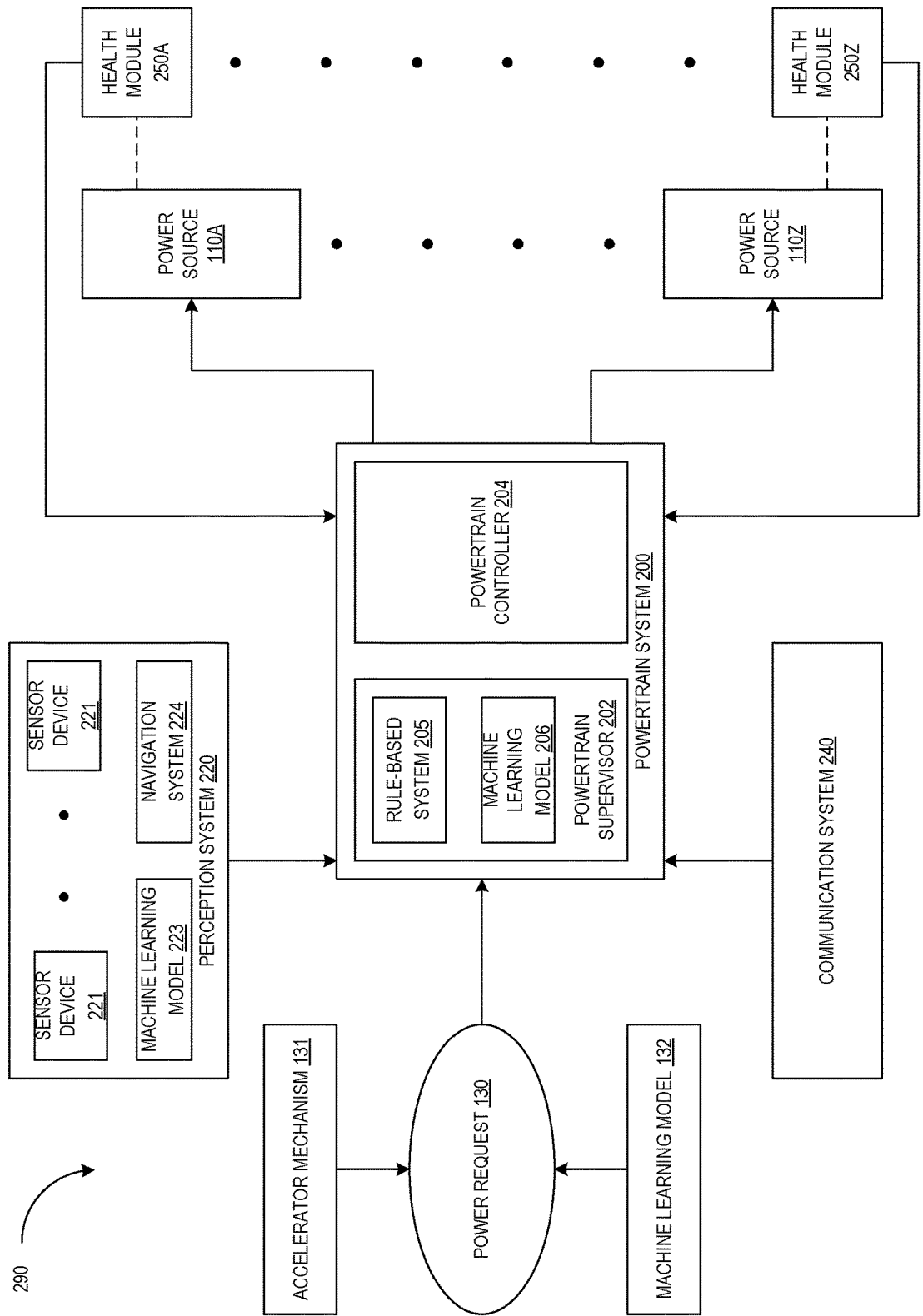
FIG. 2 is a block diagram illustrating an example powertrain system, in accordance with one or more embodiments of the present disclosure.

FIG. 2 is a block diagram illustrating an example powertrain system 200, in accordance with one or more embodiments of the present disclosure. The powertrain system 200 may be communicatively coupled to power sources 110A through 110Z. The powertrain system 200, and the power sources 110A through 110Z may be part of a vehicle 290. Vehicle 290 may be an autonomous vehicle, a semi-autonomous vehicle, a non-autonomous vehicle, a car, a truck, a van, etc. The power sources 110A through 110Z may be different types and/or sources of power for the vehicle 290 (e.g., ICE, fuel cell, battery, etc.). The power generated/provided by the power sources 110A through 110Z may be used to operate/power components of the vehicle 290 that may be used to move the vehicle 290 (e.g., transmission, gears, electric motor, etc.). The powertrain system 200 may include the various components that are used to move the vehicle 290. The vehicle 290 may be a hybrid vehicle.

In one embodiment, the powertrain system 200 may receive a power request 130. The power request 130 may indicate the amount of power (e.g., in various units, such as horsepower, watts, etc.) that is being requested for moving the vehicle 290. In one embodiment, the power request 130 may be determined, obtain generated, etc., based on a user input (e.g., input received from a driver) via an accelerator mechanism 131 (e.g., a gas/accelerator pedal, buttons, dials, switches, etc.). In another embodiment, the power request 130 may be determined obtained, generated, etc., based on a machine learning model 132 that allows the vehicle 290 to operate autonomously and/or semi-autonomously. In some embodiments, the machine learning model 132 is optional and dependent on whether vehicle 290 has any autonomous driving functionality.

In one embodiment, the powertrain system 200 includes a powertrain controller 204. The powertrain controller 204 may determine a power distribution based on the power request 130. The powertrain controller 204 may use different power sources 110A through 110Z to provide the amount of power indicated in the power request 130. For example, the powertrain controller 204 may control or instruct the powers sources 110A through 110Z to generate/provide certain amounts of power. The total amount of power requested/indicated in the power request 130 may be divided among the power sources 110A through 110Z in any combination.

In one embodiment, the perception system 220 may include one or more sensors devices 221. The sensors devices 221 may also be referred to as sensors. Examples of sensors may include, but are not limited to, cameras (e.g., digital camera, video cameras, etc.), radar devices, light detection and ranging (LIDAR) devices, ultrasonic devices (e.g., ultrasonic emitters), location devices (e.g., global positioning system (GPS) devices), etc. The sensor devices 221 may be used to detect conditions, objects, etc., of an environment where the vehicle 290 may be located. For example, a sensor device 221 may be used to detect objects (e.g., pedestrians, other vehicles, bicyclists, etc.), traffic control devices (e.g., stop lights, signs, lane markers/markings, crosswalks, etc.), sidewalks, lanes/streets, vegetation (e.g., trees, bushes, shrubs, etc.), buildings, parking lots, etc., that may be in the environment. The sensor devices 221 may generate sensor data. The sensor data may indicate, represent, etc., the conditions, objects, etc., of the environment where the vehicle 290 may be located. The for example, the sensor data may indicate the size, location, speed, etc., of an object in the environment.

In one embodiment, the perception system 220 may generate perception data. The perception data may also and/or further indicate information about the scenario, situation, circumstances, and/or environment where the vehicle 290 is located. For example, the sensor data may indicate different locations of an object over a period of time. The perception system 220 may determine a path for object based on the sensor data. The path for the object may be indicated, represented, depicted, etc., by the perception data. In another example, the perception data may indicate the road conditions, weather conditions, and road type of where the vehicle 290 is travelling. In some embodiments, the perception data may include the sensor data and/or may include modified sensor data. For example, the perception data may include sensor data that has been converted to a different format or the action sensor data generated by the sensor devices 221.

In one embodiment, the perception system includes a machine learning model 223. The machine learning model 223 may generate one or more outputs (e.g., inferences, actions, decisions, etc.) based on the sensor data generated by the sensor devices 221 (e.g., the machine learning model 223 may use the sensor data as input to generate the one or more outputs). For example, the machine learning model 223 may determine whether an object is a pedestrian, a vehicle 290, etc. In another example, the machine learning model 223 may determine a path for the vehicle 290 which avoids other objects in the environment. In some embodiments, output of the machine learning model 223 (e.g., the inferences, actions, decisions, etc.) may be perception data. For example, the path for the vehicle 290 (which avoids other objects in the environment) may be perception data.

As illustrated in FIG. 2, the vehicle 290 also includes health modules 250A through 250Z. Each of the health modules 250A through 250Z may be communicatively coupled to the powertrain system 200. For example, the health modules 250A through 250Z may transmit/receive data directly to the power trains system 200 or via a bus (e.g., a CAN bus). Each of the health modules 250A through 250Z may be associated with a respective one of the power sources 110A through 110Z. In other embodiments, a single health module may be associated with multiple power sources.

In one embodiment, the health modules 250A through 250Z may determine health values for the power sources. Each of the health modules 250A through 250Z may receive data and/or information from sensors, components, modules, etc., that are associated with a respective power source. For example, power source 110A may be a battery and health module 250A may receive data indicating a charge, a temperature, a voltage, etc., of the battery from various sensors that may be coupled to the battery. Based on the data received from the sensors, components, modules, etc., that are associated with power source 110A. the health module 250A may determine, calculate, generate, etc., a health value for the power source 110A.

In one embodiment, a health value for a power source may indicate a health and/or a condition of the power source. The health value may indicate the health and/or condition as compared to an ideal condition or a reference condition. For example, the reference/ideal condition of a battery (e.g., a power source) may be the condition of the battery when the battery is new (e.g., newly manufactured, newly installed in the vehicle 290, etc.). The reference/ideal condition may be expressed in various units and/or may be express as a percentage. For example, the reference/ideal condition of power source 110A may be 100%. The health value (determined by health module 250A) for the power sources 110A may be less than or equal to 100%. For example, the health module 250A may determine that the health value for the power source 110A may be 90%.

In one embodiment, the health value for a power source may indicate a penalty to the current health or condition of the power source if the power source is used. For example, the health value may indicate a percentage decrease in the condition of the power sources. If the health value was 5, this may indicate that there would be a 5% decrease/degradation in the health/condition of the power source. In another embodiment, the health value for a power source may indicate the health (e.g., the resulting health) of the power source if the power source is used. For example, a health value of 87 may indicate that the health of the power source would be 87% after the power source is used.

In one embodiment, the health modules 250A through 250Z may be machine learning models. For example, each of the health modules 250A through 250Z may be neural networks, regression models, support vector machines, etc. In another example, each of the health modules 250A through 250Z may be recurrent neural networks (RNNs), long short-term memory (LSTM) neural network, etc. Each of the health modules 250A through 250Z may be trained to determine health values for the type of power sources 110A through 110Z that is associated with the respective health module. For example, if power source 110A is a battery and power sources 110Z is a fuel cell, health module 250A may be trained to determine health values for batteries and health module 250Z may be trained to determine health values for fuel cells, as discussed in more detail below.

In one embodiment, a power source (e.g., power source 110A) may be a battery. The health module which corresponds to or is associated with the power source (e.g., health module 250A) may use a certain set of parameters, factors, conditions, sensor data, other information, etc., to determine a health value for the battery. For example, the health module 250A may be a RNN, a LSTM neural network, etc., that uses one or more of a temperature of the battery, voltages of different cells of the battery, a current charge of the battery, cell impedance, cell inductance, operational history of the battery, as an input for determining, generating, calculating, etc., a health value for the battery. The operational history for the battery may include data indicate past voltages, charges, cell impedances, and/or other historical data regarding the operation and/or condition/state of the battery. In some embodiments, the operational history may be stored in memories, registers, caches, etc., of various components, systems, or modules of the vehicle 290.

In one embodiment, a power source (e.g., power source 110Z) may be a fuel cell. The health module which corresponds to or is associated with the power source (e.g., health module 250Z) may use a certain set of parameters, factors, conditions, sensor data, other information, etc., to determine a health value for the fuel cell. For example, the health module 250Z may be a RNN, a LSTM neural network, etc., that uses the temperature of the fuel cell, a humidity of a membrane of the fuel cell, a voltage of the fuel cell, an operational history of the fuel cell, as an input for determining, generating, calculating, etc., a health value for the fuel cell. The operational history for the fuel may include data indicate past voltages, charges, humidities, and/or other historical data regarding the operation and/or condition/state of the fuel cell.

In one embodiment, the health modules 250A through 250Z may determine health values for power sources 110A through 110Z while the vehicle 290 is in operation. For example, the health modules 250A through 250Z may determine health values for power sources 110A through 110Z while the vehicle 290 while the vehicles is running, driving, moving, etc. In another example, the health modules 250A through 250Z may determine health values for power sources 110A through 110Z while the power sources 110A through 110Z are running, operating, providing power, etc.

As illustrated in FIG. 2, the powertrain system 200 includes a powertrain supervisor 202. The powertrain supervisor 202 may be hardware (e.g., circuits), software, firmware, or a combination thereof. The powertrain supervisor 202 may be communicatively coupled to the perception system 220 and to the powertrain controller 204. For example, the powertrain supervisor 202 may be coupled, wired or wirelessly, to the powertrain controller 204 and/or the perception system 220 via cables, wires, pins, traces, etc. In another example, the powertrain supervisor 202 may be coupled to the powertrain controller 204 and/or the perception system 220 via a bus (e.g., a communication bus), such as a controller area network (CAN) bus, a FlexRay bus, a time-triggered protocol (TTP) bus, etc. The powertrain supervisor 202 (and/or the powertrain system 200) may receive data and/or information from the perception system 220, as discussed in more detail below. The powertrain supervisor 202 (and/or the powertrain system 200) may also receive data/information from other devices, systems, components, etc., that may be coupled to the power train system 200 directly or via a bus (e.g., a CAN bus). For example, the powertrain supervisor 202 may receive information about the current charge/state of a battery, about the current amount of fuel in a fuel tank, the current gear state in a transmission system, whether the windshield wipers are activated/on, whether the headlights are on, etc. This other information may be referred to as vehicle state. The vehicle state may indicate the state, condition, etc., of the vehicle 290 and/or of various components, systems, modules, etc., within the vehicle.

In one embodiment, the powertrain supervisor 202 may determine the power distribution for power sources 110A through 110Z based on the power request 130 and perception data received from the perception system 220. As discussed above, the power distribution may indicate amount of power for each of the power sources 110A through 110Z (e.g., may indicate an amount of power that each power source should generate/provide).

In one embodiment, the powertrain supervisor 202 may provide the power distribution to the powertrain controller 204. For example, the powertrain supervisor 202 may send a message (or some other data) to the powertrain controller 204. The message may indicate how much power should be requested from each of the power sources 110A through 110Z. For example, the message may include a list of numbers (e.g., a power distribution) and each number may indicate an amount of power for a respective power source.

In one embodiment, the powertrain supervisor 202 may include a rule-based system 205. For example, the rule-based system 205 may determine whether various conditions, parameters, prerequisites, criteria, limitations, guidelines, etc. have been met, satisfied, etc. The rule-based system 205 may use the parameters, perquisites, etc., to identify a power distribution for the power sources 110A through 110Z. For example, the rule-based system 205 may use a table to look up power distributions that correspond to parameters, prerequisites, etc., that have been met, satisfied, etc., as discussed in more detail below.

In one embodiment, the powertrain supervisor 202 may include a machine learning model 206 as an addition to or as an alternative to the rule-based system 205. The machine learning model 206 may use the perception data (generated by the perception system 220), the power request 130, vehicle state, and combinations thereof to determine a power distribution for the power sources 110A through 110Z. For example, the perception data and/or the power request 130 may be provided as an input to the machine learning model 206. In another example, the health values generated, determined, etc., by the health modules 250A through 250Z may also be provided as an input to the machine learning model 206. In a further example, information about the state/condition of the vehicle 290 and/or about the state/condition of components of the vehicle 290 may be provided as an input to the machine learning model 206. The machine learning module 206 may generate a power distribution as an output (e.g., an inference) based on the perception data, power request 130, health values, and/or other information about the state/condition of the vehicle 290 (e.g., vehicle state).

In one embodiment, the machine learning module 206 may generate power distributions to reduce and/or minimize the overall power consumption (e.g., the amount of power used) of the vehicle 290 from the power sources 110A through 110Z, while still satisfying the power request 130 (e.g., still providing the amount of power requested in the power request 130). The perception data may allow the machine learning model 206 to generate different power distributions based on different scenarios and/or different time frames/distances for the scenarios, as discussed in more detail below.

As discussed above, the powertrain supervisor 202 may receive the power request 130. In one embodiment, the powertrain supervisor 202 may obtain perception data from the perception system 220. For example, the powertrain supervisor 202 may request the perception data from the perception system 220 based on the power request 130. In another embodiment, the powertrain supervisor 202 may continually receive perception data from the perception system 220. For example, as the vehicle 290 operates, the sensor devices 221 may continuously generate sensor data and the machine learning model 223 may continuously generate perception data based on the sensor data. The perception data may be continuously provided to the powertrain supervisor 202.

As discussed above, the perception data may be indicative of one or more scenarios, situations, circumstances, environments, etc., where the vehicle 290 is located. For example, perception data may indicate the conditions of the environment in which the vehicle 290 is located, the intention of a driver of the vehicle 290 (e.g., to avoid an obstacle, to pass another vehicle, to travel to a particular destination, etc.).

In one embodiment, different portions of the perception data may be associated with different time frames (e.g., time periods, periods of time, etc.) and/or distance intervals (e.g., a range of distances from the vehicle, etc.). For example, the perception data may indicate a scenario where the vehicle 290 is driving in a lane on the highway and there is another vehicle in the lane. Thus, the power request 130 may be for additional power to allow the vehicle 290 to accelerate and pass the other vehicle onto lane. The time frame or distance interval for the scenario (e.g., situation, conditions, etc.) indicated by the perception data may referred to a short or shorter time frame or distance interval (e.g., 0 to 50 meters away from the vehicle 290, or some other appropriate range of distances). The time frame or distance interval for the scenario may be determined based on the range of the sensor devices 221. For example, the maximum range of the sensor devices 221 may allow the sensor devices 221 to detect objects, conditions, etc., up to a certain time frame or distance interval (e.g., a range) ahead of the current time (e.g., 10 seconds ahead, 30 seconds ahead, or some other appropriate time) based on the current speed of the vehicle. Thus, the portion of the perception data that is based on the sensor data may be associated with the time frame or distance interval. This may allow the powertrain supervisor 202 to generate a power distribution that may minimize or reduce the power consumption of the vehicle 190 in view of the shorter time frame or distance interval.

In one embodiment, other portions of the perception data may be associated with a long or longer time frame or distance interval. For example, the perception data may indicate a route between a starting point and a destination. The distance interval or time frame for travelling along that route may be longer than the time frame or distance interval associated with the maximum range of the sensor devices 221 (e.g., 50 to 200 meters away from the vehicle 290, or some other appropriate range of distances). For example, while the maximum range of the sensor devices may allow the sensor devices 221 to detect objects up 30 seconds ahead, the amount of time to travel along the route may be 25 minutes, an hour, etc. This may allow the powertrain supervisor 202 to generate a power distribution that may minimize or reduce the power consumption of the vehicle 190 (from the power sources 110A through 110Z) in view of the period of time to travel along the route (e.g., over a longer period of time).

In one embodiment, the powertrain supervisor 202 may also use the health values generated by the health modules 250A through 250Z to determine a power distribution. For example, based on the degradations in the health/condition of different power sources, the powertrain supervisor 202 may select a power distribution that provides for an efficient energy consumption of the power sources, and also reduces and/or minimizes the degradation to the health/condition of the power sources.

The powertrain supervisor 202 may determine a power distribution based on the perception data, as discussed above. The powertrain supervisor 202 may provide the power distribution to the powertrain controller 204. For example, the powertrain supervisor 202 may transmit a message indicating the power distribution to the powertrain controller 204 via a bus (e.g., a CAN bus, a FlexRay bus, etc.).

In one embodiment, the powertrain controller 204 may control the power sources 110A based on the power distribution generated by the powertrain supervisor 202. For example, the powertrain controller 204 may control or instruct the powers sources 110A through 110Z to generate/provide certain amounts of power based on the power distribution. As discussed above, the power distribution may indicate an amount of power that should be generated/provided by each of the power sources 110A through 110Z. For example, the power distribution may indicate the amount of units of power (e.g., horsepower, newton meters, etc.) that each power source 110A through 110Z should generate/provided. In another example, the power distribution may indicate a percentage of the amount of power indicated in the power request 130. For example, the power request 130 may indicate 500 watts of power. The power distribution (generated by the powertrain supervisor 202) may indicate that 20% of the 500 watts should be generated/provided by power source 110A, 45% of the 500 watts should be generated/provided by power source 110B, and 35% of the 500 watts should be generated/provided by power source 110C.

In one embodiment, the powertrain controller 204 is configured to cause or instruct each of the power sources 110A through 110Z to generate/provide a respective amount of power as indicated by the power distribution. The powertrain controller 204 may control the power sources 110A through 110Z by controlling, actuating, etc., various mechanisms, components, actuators, etc., for each of the power sources 110A through 110Z to cause the power sources 110A through 110Z to generate/provide various amounts of power, as indicated by the power distribution. For example, the powertrain controller 204 may control, activate, etc., fuel injectors, valves, hydraulic actuators, spark plugs, traction motors, etc.

In one embodiment, the powertrain supervisor 202 may be communicatively coupled to a communication system 240. The communication system 240 may include components, circuits, modules, etc., that allow the vehicle 290 to communicate with various other devices. For example, the communication system 240 may include radio frequency transmitters and/or receivers (e.g., transceivers), wireless network interfaces, etc., that allow the communication system 240 to communicate with other vehicles, pedestrians, infrastructure (e.g., transportation infrastructure such as bridges, roads, traffic devices, etc.). The communication system 240 may be capable of one or more of vehicle-to-infrastructure (V2I) communication, vehicle-to-network (V2N) communication, vehicle-to-vehicle (V2V) communication, vehicle-to-pedestrian (V2P) communication, vehicle-to-device (V2D) communication, vehicle-to-grid (V2G) communication, vehicle-to-everything (V2X) communication. The communication system 240 may generate communication data based on messages, packets, data, etc., that is communicate with other devices, other vehicles, infrastructure, etc. For example, a V2I communication may indicate that a bridge is being raised which may result in traffic (e.g., a traffic scenario) at a later point in time. Based on the communication data, the powertrain supervisor 202 may generate a power distribution that uses power from a battery more than power from other sources. This may be due to the traffic scenario that results from the bridge being raised. For example, when there is traffic, regenerative braking may be used to recharge the battery due to the stop and go nature of traffic. Thus, it may be more efficient to use the battery since the battery may be recharged during the traffic scenario.

In one embodiment, the perception system 220 may include a navigation system 224. For example, the perception system 220 may include a GPS device that may detect the location of the vehicle 290 and may include maps of various locations. The navigation system 224 may determine a route for the vehicle 290 based on the location of the vehicle 290 and a destination (e.g., a destination provided by a driver of the vehicle 290). The navigation system 224 may also generate perception data that may indicate one or more locations of the vehicle 290 and the route for the vehicle 290. The powertrain supervisor 202 may determine a power distribution based on the route and/or locations of the vehicle 290. For example, if the route indicates that the user will travel on local roads for the first half of the route and on a highway for the second half of the route, the powertrain supervisor 202 may generate a power distribution that uses a battery more for the first half of the route and uses a fuel cell more for the second half of the route.

Although vehicle 290 may be a hybrid vehicle, the embodiments, examples, and/or implementations described herein may also be used when the vehicle is not a hybrid vehicle (e.g., only includes one power source). When the vehicle is not a hybrid vehicle powertrain supervisor 202 may determine how to operate the various mechanisms, actuators, etc., of the power source to increase and/or maximize efficiency. For example, intake valves may be adjusted to change the air to fuel ratio in a fuel cell vehicle when the vehicle is entering a long tunnel (where the amount of oxygen may be lower than normal). This may allow the fuel cell to operate more efficiently when the vehicle is in the tunnel and there is less oxygen.

In some embodiments, the powertrain system 200 (e.g., the powertrain supervisor 202 and/or the powertrain controller 204) may be able to increase the power efficiency of the vehicle 290. For example, the powertrain system 200 may be able to minimize and/or reduce power consumption of the vehicle 290 by changing the power distribution based on the scenarios, situations, environments, etc., indicated by the perception data. The power distributions may allow for a more optimal consumption of energy by the vehicle in view of scenarios with shorter time frames/distance intervals (e.g., a time period or distance interval based on the maximum range of the sensor devices 221) and longer time frames/distances (e.g., over the route of the vehicle 290). This may decrease the cost of operating the vehicle 290. In another example, the powertrain system 200 may be able to optimize or reduce the energy consumption over the driving cycle of the vehicle 290. The driving cycle of the vehicle 290 may be the time at which the vehicle started operation (e.g., when the ignition was turned on) to the time at which vehicle 290 stopped operation (e.g., when the ignition was turned off). The perception data may indicate the scenarios that may be encountered by the vehicle over the driving cycle of the vehicle 290.

In some embodiments, the powertrain system 200 (e.g., the powertrain supervisor 202 and/or the powertrain controller 204) may be able to maintain the health/condition of power sources 110A through 110Z. The powertrain system 200 (e.g., the powertrain supervisor 202 and/or the powertrain controller 204) may also be able to reduce the decline, decrease, degradation, etc., in the condition/health of the power sources 110A through 110Z. As discussed above, the powertrain system 100 (e.g., the powertrain supervisor 202, the machine learning model 206, etc.) may use the health values determined by the health modules 250A through 250Z and other data/information (e.g., perception data, vehicle state, etc.) when determining the power distribution for the power sources 110A through 110Z. By using the health values, the powertrain system 200 may be able to use a power distribution that provides an efficient use of energy from the power sources 110A through 110Z, and/or decreases or minimizes the degradation in the health/condition of the power sources 110A through 110Z.

In some embodiments, minimizing and/or reducing the power consumption of the vehicle 290 may allow for a reduction in the amount of fuel (e.g., hydrogen gas, gasoline, electricity, etc.) that the vehicle 290 needs to store in order for a desired range for the vehicle 290. For example, the size of the fuel tank may be decreased while still allowing the vehicle 290 to travel the same range based on the minimized or reduce power consumption. This may decrease the cost of the vehicle 290 and/or the cost of manufacturing the vehicle 290.

In some embodiments, the powertrain system 200 may allow for better and/or more accurate range estimations. For example, the vehicle 290 may provide an estimated range for the vehicle 290 based on the available amount of fuel (e.g., hydrogen gas, electricity, etc.) for the vehicle 290. By using the perception data, the powertrain system 200 may be able to provide a more accurate estimate of the range based on the scenarios indicated by the perception data (e.g., based on traffic, based on whether the route will be going uphill/downhill which affects fuel efficiency, etc.).

In some embodiments, both a ruled based system and the machine learning model 206 may be used to determine a power distribution. For example, the average of the power distribution generated by the machine learning model 206 and the power distribution obtained from the rule based system may be used. In another example, the power distribution from the rule based system may be used to set a boundary on the power distribution generated by the machine learning model (e.g., an upper boundary or a lower boundary).

Figure 3:
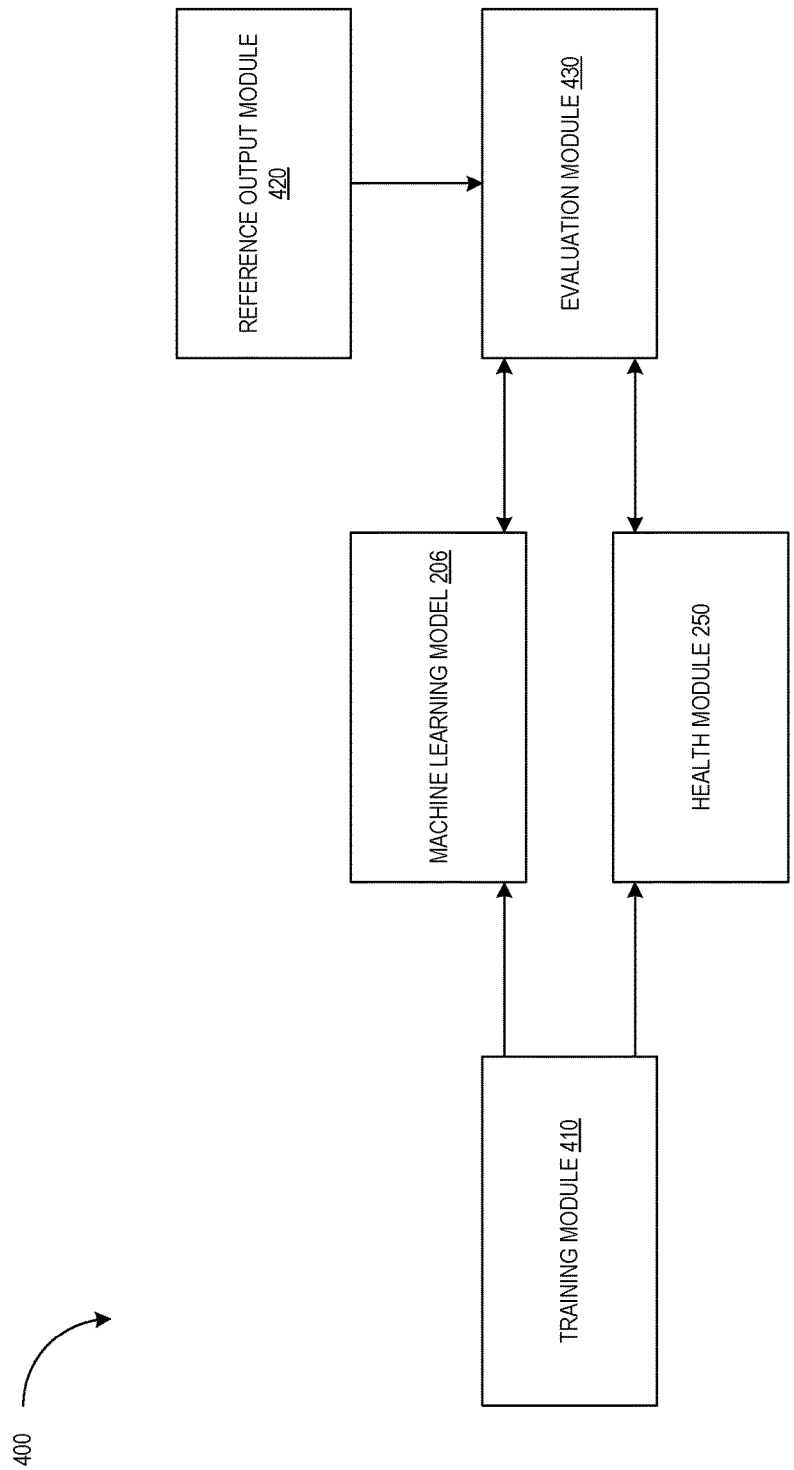
FIG. 3 is a block diagram, illustrating an example training system, in accordance with one or more embodiments of the present disclosure.

FIG. 3 is a block diagram, illustrating an example training system 400, in accordance with one or more embodiments of the present disclosure. The training system 400 includes a training module 410, a machine learning model 206 for the overall decision making in the powertrain system (e.g., a neural network or a reinforcement learning algorithm), a health module 250 (e.g., a RNN, a LSTM neural network, etc.) a reference output module 420, and an evaluation module 430. The training system 400 may be used to train the machine learning model 206. The training system 400 may also be used to train health module 250 (e.g., one or more of the health modules 250A through 250Z illustrated in FIG. 2), possibly with labels for health values from measurements and/or simulation environments. The training system 400 may be used to train the machine learning model 206 and/or the health module 250 before the machine learning model 206 and/or the health module 250 are deployed in a vehicle. The training system 500 may also be used to update a machine learning model 206 and/or the health module 250 after they were initially trained and/or deployed. The training system 500 may allow the machine learning model 206 and/or the health module 250 to be trained offline (e.g., to be trained while the machine learning model 206 and/or the health module 250 are not deployed within a vehicle).

The training module 410 may be any combination of one or more computing devices, hardware, software, firmware, etc. The training module 410 may receive training data from various sources. For example, the training module 410 sensor data that was generated by sensor devices in one or more vehicles. The training module 410 may receive recorded sensor data generated by a fleet of vehicles. In another example, the training module 410 may receive perception data. The training module 410 may optionally tag and or label the training data. For example, different portions of the training data (e.g., different images, different videos, etc.) may be tagged or labeled with identifiers for different scenarios, environments, conditions, etc. The tags of labels may indicate a traffic condition (e.g., whether there is traffic, speed of the vehicle, etc.), a road type (e.g., concrete, asphalt, dirt, freeway, local road, etc.), a weather condition (e.g., rain, snow, etc.), an environment temperature (e.g., outside temperature), and an operating temperature of a power source (e.g., temperature of a battery, fuel cell, ICE, etc.). The training module 410 may provide the tagged and/or labelled training data to the machine learning model 206. The machine learning model 206 may receive the training data and may generate a set of power distributions based on the training data, as discussed above. The set of power distributions generated by the machine learning module 206 may be provided to the evaluation module 430. The training module 410 may also provide the tagged and/or labelled training data to the health module 250. The health module 250 may receive the training data and may generate a set of health values based on the training data, as discussed above. The set of health values generated by the health module 250 may be provided to the evaluation module 430.

The reference output module 420 may be any combination of one or more computing devices, hardware, software, firmware, etc. The reference output module 420 may generate a set of reference power distributions based on a set of reference data. The set of reference data may include sensor data, perception data, data that may be used to determine the health/condition of power sources (e.g., temperatures, humidity, carbon dioxide levels, voltages, current charge, etc.), navigation data, data regarding the state/condition of a vehicle, etc. The reference output module 420 may use various techniques, algorithms, functions, formulas, etc., to generate the set of reference power distributions based on the set of reference data. For example, the reference output module 420 may use an equivalence consumption minimization strategy (ECMS), the Pontryagin's minimum principle (PMP), the model predictive control (MPC), dynamic programming, etc., to generate the set of reference power distributions based on the training data (e.g., based on perception data and/or sensor data). The reference output module 420 may provide the set of reference power distributions to the evaluation module 430. The set of reference data may be separate from the training data that is used to train the machine learning module 206 and/or the health module 250. In one embodiment, the set of reference power distributions may be included in the training data that is provided to the machine learning model 206.

In one embodiment, the reference output module 420 may generate a set of reference health values based on a set of reference data. The set of reference data may include sensor data, data that may be used to determine the health/condition of power sources (e.g., temperatures, humidity, carbon dioxide levels, voltages, current charge, etc.), navigation data, data regarding the state/condition of a vehicle, etc. The reference output module 420 may use various techniques, algorithms, functions, formulas, etc., to generate the set of reference power distributions based on the set of reference data (e.g., ECMS, PMP, MPS, etc.). The reference output module 420 may provide the set of reference health values to the evaluation module 430. In some embodiments, the set of reference data may be used only to generate the set of reference power distributions and/or the set of health values.

In one embodiment, the set of reference power distributions and/or set of health values may be generated based on the driving cycles of the vehicles. For example, the reference power distributions may be generated in view of the entire driving cycle of the vehicle (e.g., in view of the entire time that the vehicle is in operation). The driving cycle may include the velocity of the vehicle during the trip, the grade (e.g., incline/decline of the road) of the road, street, etc., and direction/velocity of wind (e.g., crosswind), etc. This may allow the set of reference power distributions to provide the optimal power consumption considering the entire driving cycle of the vehicle, rather than just for a specific time or time period. The set of reference power distributions may also be generated based on a set of reference velocity profiles of one or more vehicles. A velocity profile may indicate different speeds at different points in time for a vehicle. For example, if a vehicle was driving for twenty minutes, a velocity profile may indicate the different speeds of the car during that twenty minutes. The interval or time period of the speed measurements may vary. For example, a velocity profile may indicate a speed for the vehicle every 15 seconds, every minute, etc., during a trip. The reference drive cycles and the reference velocity profiles may be separate from the training data that is used to train the machine learning module 206 and/or the health module 250. In one embodiment, the reference drive cycles and the reference velocity profiles may be used only to generate the set of reference power distributions.

The evaluation module 430 may be any combination of one or more computing devices, hardware, software, firmware, etc. In one embodiment, the evaluation module 430 may compare the set of power distributions generated by the machine learning module 206 and the set of reference power distributions generated by the reference output module 420. For example, the evaluation module 430 may compare each power distribution in the set of power distributions and with a respective power distribution in set of reference power distributions to determine if the two power distributions are within a threshold of each other of if they match. If the set of power distributions is within an acceptable threshold of the set of reference power distributions, the evaluation module 430 may provide an indication that training of the machine learning model 206 is complete. If the set of power distributions is not within an acceptable threshold of the set of reference power distributions, the evaluation module 430 may provide an indication that training of the machine learning model 206 should be adjusted. For example, the weights of the machine learning model 260 may be modified/adjusted and a new set of power distributions may be generated by the machine learning model 206 (e.g., after the machine learning model 206 has been adjusted, after the weights have been adjusted, etc.) and compared with the set of reference power distributions. The adjustment of the machine learning model 206 and the comparison with the set of reference power distributions may be repeated (e.g., repeated in a cycle, loop, etc.) until the machine learning model 206 has been trained.

In one embodiment, the evaluation module 430 may compare the set of health values generated by the machine learning module 206 and the set of reference health values generated by the reference output module 420. For example, the evaluation module 430 may compare each health value in the set of health values and with a respective health value in set of reference health values to determine if the two health values are within a threshold of each other of if they match. If the set of health values is within an acceptable threshold of the set of reference health values (or matches the set of reference health values), the evaluation module 430 may provide an indication that training of the machine learning model 206 is complete. If the set of health values is not within an acceptable threshold of the set of reference health values, the evaluation module 430 may provide an indication that training of the machine learning model 206 should be adjusted. For example, the weights of the machine learning model 260 may be modified/adjusted and a new set of health values may be generated by the machine learning model 206 (e.g., after the machine learning model 206 has been adjusted, after the weights have been adjusted, etc.) and compared with the set of reference health values. The adjustment of the machine learning model 206 and the comparison with the set of reference health values may be repeated (e.g., repeated in a cycle, loop, etc.) until the machine learning model 206 has been trained.

Figure 4:
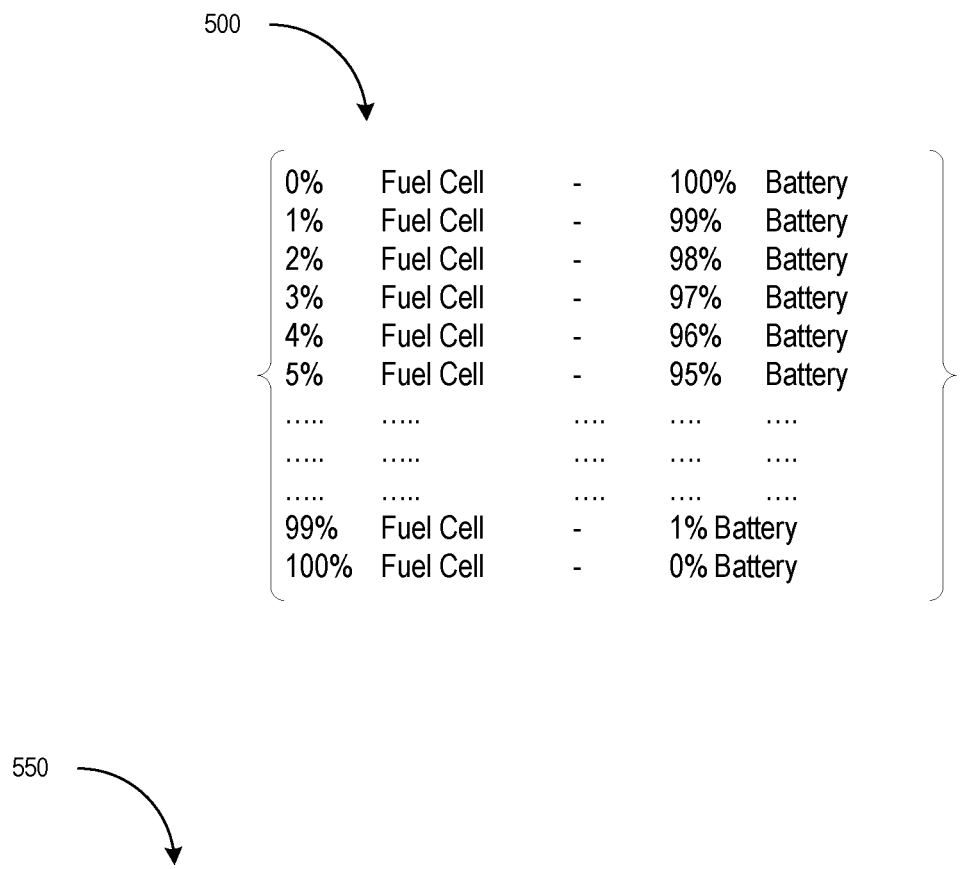
FIG. 4 is a diagram illustrating example set of power distributions and an example equation that may be used to determine a set of reference health values.

FIG. 4 is a diagram illustrating example set of power distributions 500 and an example equation 550 that may be used to determine a set of reference health values. The set of power distributions 500 includes different combinations of power distributions between two power sources, a battery and a fuel cell. Although two power sources are illustrated in FIG. 4, any number of power sources may be used and the set of power distributions 500 may include combinations of power distributions for the different number of power sources. In addition, although the power distributions for each power source vary by 1% increments, the increments may be larger or smaller in other embodiments (e.g., may vary by 0.5% or 5% increments).

The power distributions (which may be referred to as energy pairs or power pairs) may be used to compute an initial energy cost for using each of the fuel cell and the battery. For example, energy cost of using the fuel cell and the battery may be calculated for the power distribution of 0% for the fuel cell and 100% for the battery, and then for the power distribution of the power distribution of 1% for the fuel cell and 99% for the battery, up to the power distribution of 100% for the fuel cell and 00% for the battery. As discussed above various techniques, algorithms, functions, etc., may be used to determine the initial energy cost for each power distribution. For example, PMP may be used to determine an initial energy cost for each power distribution. Each initial energy cost (for each power distribution) may indicate an energy cost for the battery and an energy cost for the fuel cell.

As illustrated in FIG. 4, equation 550 is defined as follows: Final Cost=(Batt_Cost*(Batt_Health_Penalty+Lambda))+(FC_Cost*(FC_Health_Penalty)). Equation 550 may be applied to each power distribution (e.g., each row) in the set of power distributions 500. Batt_Cost may represent the initial energy cost of using a battery for a particular power distribution. Batt_Health_Penalty may represent the penalty (e.g., the amount of degradation) for using the battery in the power distribution. Lambda may represent the cost for using the battery for a particular period of time, distance, or trip/route. In particular, lambda represent an extra/increased cost or penalty for using the battery if the ending power level or charge of the battery should remain the same after the battery is used. For example, if the battery was at 40% charge and is supposed to be restored back to 40% charge after use (e.g., by using the fuel cell to generate power to charge the battery back to 40%), this may increase the penalty for using the battery. FC_Cost may represent the initial energy cost of using a fuel cell for a particular power distribution. FC_Health_Penalty may represent the penalty (e.g., the amount of degradation) for using the fuel cell in the power distribution.

Each initial energy cost may then be used to determine a final cost for each power distribution by using equation 550. For example, equation 550 may be applied to each power distribution. This may generate a set of final energy costs (e.g., one final energy cost for each power distribution). The set of final energy costs may take into account the degradation to the health/condition of the battery when computing energy costs, as illustrated by the health penalties in equation 550. The lowest of the final energy costs may be identified/selected, and the power distribution associated with the lowest may be determined to be the power distribution that should be used (e.g., the optimal power distribution).

In one embodiment, the set of final energy costs may be used as a set of reference health values for training a machine learning model (e.g., machine learning module 206 illustrated in FIG. 2). For example, the power distribution that is lowest of the set of final energy costs may be determined to be the correct or reference power distribution. By using equation 550 on different combinations of power sources and/or power distributions, different reference power distributions may be generated. These reference power distributions may be used to train the machine learning model 206 and also to validate the machine learning model 206 (e.g., validate that the machine learning model 206 generates output power distributions that match the reference power distributions).

Figure 5:
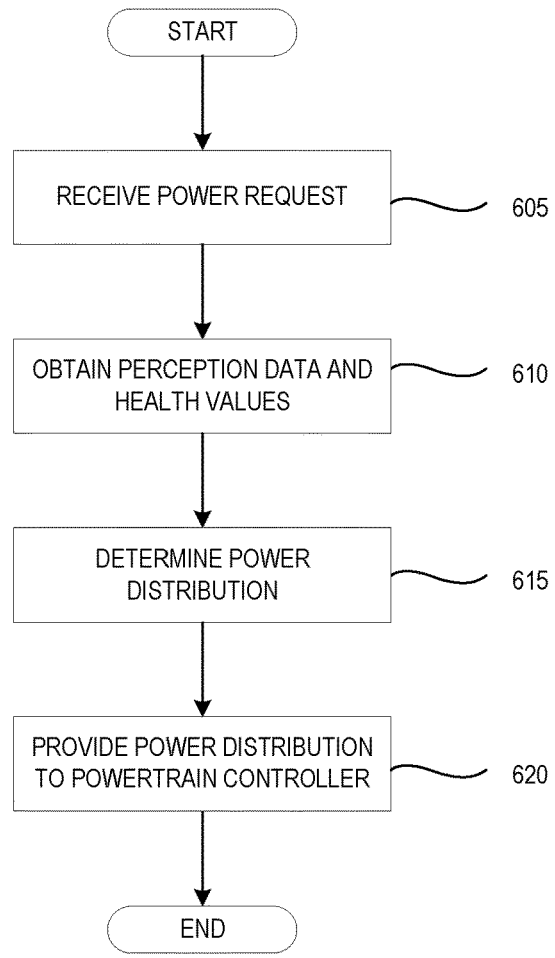
FIG. 5 is a flow diagram illustrating an example process for controlling a powertrain system, in accordance with one or more embodiments of the present disclosure.

FIG. 5 is a flow diagram illustrating an example process for controlling a powertrain system, in accordance with one or more embodiments of the present disclosure. Process 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the process 600 may be performed by one or more of a computing device, a powertrain system (e.g., powertrain system 200 illustrated in FIG. 2), a machine learning model (e.g., machine learning models 206 illustrated in FIG. 2), and/or a powertrain supervisor 202 (e.g., powertrain supervisor 202 illustrated in FIG. 2).

With reference to FIG. 5, process 600 illustrates example functions used by various embodiments. Although specific function blocks ("blocks") are disclosed in process 600, such blocks are examples. That is, embodiments are well suited to performing various other blocks or variations of the blocks recited in process 600. It is appreciated that the blocks in process 600 may be performed in an order different than presented, and that not all of the blocks in process 600 may be performed. In addition, additional other blocks (not illustrated in FIG. 5) may be inserted between the blocks illustrated in FIG. 5.

The process 600 begins at block 605 where the process 600 may receive a power request for a vehicle that includes a set of power sources. For example, the power request may be received based on a user input via an accelerator mechanism. Each power source may provide power for moving the vehicle. At block 610, the process 600 may obtain perception data generated by a perception system of the vehicle. For example, the process 600 may periodically receive the perception data or may request the perception data from the perception system of the vehicle. The process 600 may also obtain health values at block 610. Each health value may indicate one or more of the condition/state of a power source and/or may indicate a penalty (e.g., an amount of degradation) to the current condition/state of a power source.

At block 615, the process 600 may determine a power distribution based on the power request, a set of perception data, the set of health values, and a machine learning model. For example, one or more of the power request and the set of perception data may be provided as an input to the machine learning model and the machine learning model may output the power distribution. At block 620, the process 600 may provide the power distribution to a powertrain controller. The powertrain controller may control the set of power sources based on the power distribution. For example, the power distribution may indicate an amount of power that should be generated be each power source and the powertrain controller may cause or instruct each power source to generate the indicated amount of power.

Figure 6:
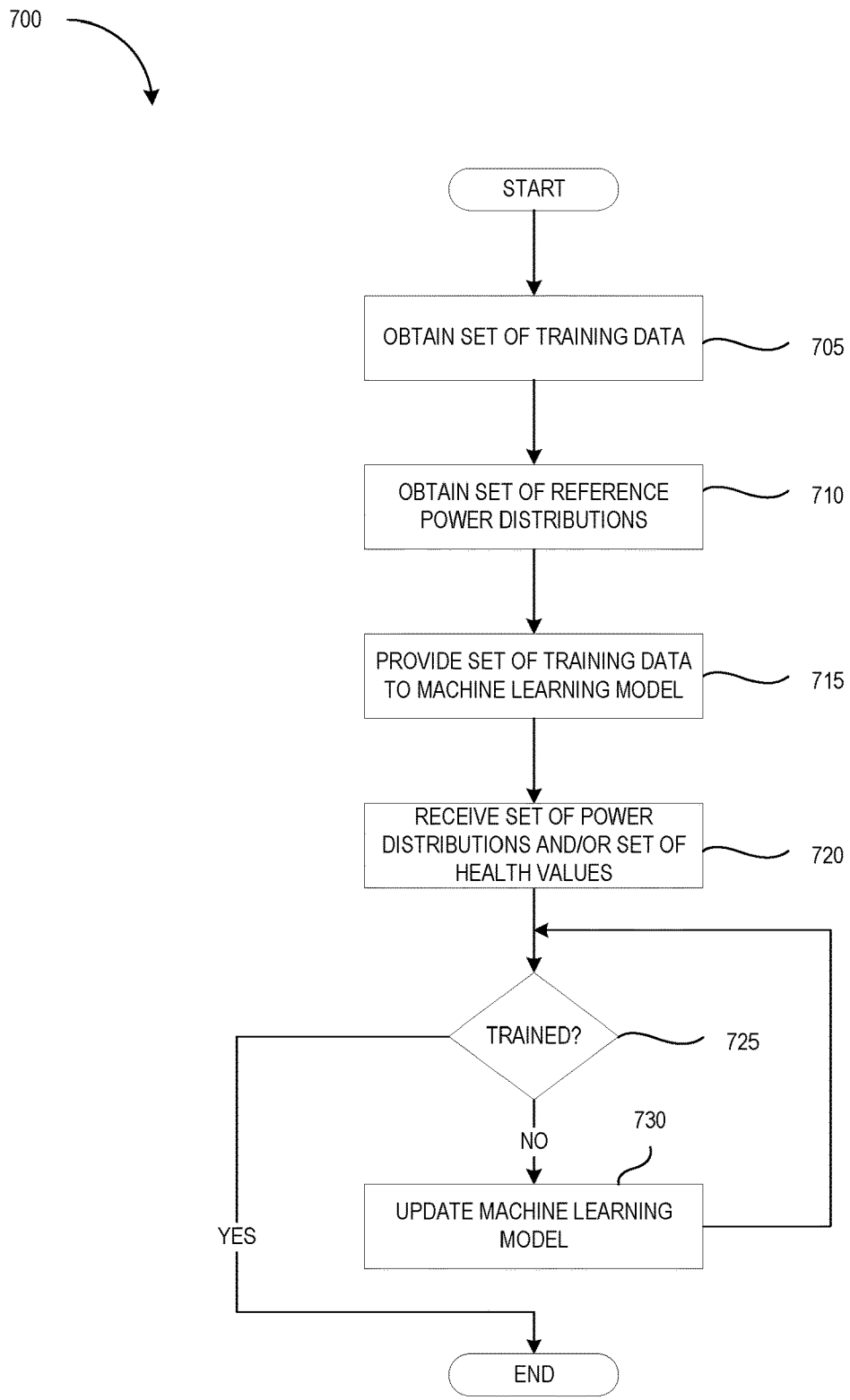
FIG. 6 is a flow diagram illustrating an example process for training a machine learning model, in accordance with one or more embodiments of the present disclosure.

FIG. 6 is a flow diagram illustrating an example process for training a machine learning model, in accordance with one or more embodiments of the present disclosure. Process 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the process 700 may be performed by one or more of a computing device, a training system (e.g., training system 400 illustrated in FIG. 3), a training module (e.g., training module 410 illustrated in FIG. 3), a machine learning model (e.g., machine learning module 206 illustrated in FIG. 3), a reference output module (e.g., reference output module 420 illustrated in FIG. 3), and an evaluation module (e.g., evaluation module 430 illustrated in FIG. 3).

With reference to FIG. 6, process 700 illustrates example functions used by various embodiments. Although specific function blocks ("blocks") are disclosed in process 700, such blocks are examples. That is, embodiments are well suited to performing various other blocks or variations of the blocks recited in process 700. It is appreciated that the blocks in process 700 may be performed in an order different than presented, and that not all of the blocks in process 700 may be performed. In addition, additional other blocks (not illustrated in FIG. 6) may be inserted between the blocks illustrated in FIG. 6. In one embodiment, the process 700 may be used to train a machine learning model that generates power distributions. In another embodiment, the process 700 may be used to train a machine learning model that generates health values (e.g., to train a health module).

The process 700 begins at block 705 where the process 700 may obtain a set of training data. The training data may include perception data and/or sensor data. The training data may be used to train a machine learning model. The set of training data may include information about an environment where a vehicle is located. At block 710, the process 700 may obtain a set of reference power distributions for a set of power sources of the vehicle based on one or more of set of reference data, a set of reference drive cycles, a set of reference velocity profiles, etc. For example, the process 700 may use ECMS, PMP, MPC, etc., to generate the set of reference power distributions based on data set of reference data. In one embodiment, the set of training data may include sensor data and other data/information generated by components that are coupled to and/or associated with a power source. For example, the training data may include temperatures of a fuel cell or battery, voltages, humidities of a membrane of a fuel cell, etc.

At block 715 the training data is provided as an input to the machine learning model. When the process 700 is used to train a machine learning model that generates power distributions, the machine learning model may generate a set of power distributions as an output and the set of power distributions may be received at block 720. When the process 700 is used to train a machine learning model that generates health values, the machine learning model may generate a set of health as an output and the set of health values may be received at block 720. At block 725, the process 700 may determine whether the machine learning model has been trained. For example, the process 700 may compare the set of power distributions with the set of reference power distributions to determine whether the power distributions in each set are within a threshold of each other. In another example, the process 700 may compare the set of health values with the set of reference health values to determine whether the power distributions in each set are within a threshold of each other. If the machine learning model is not trained, the machine learning model may be updated at block 730. For example, the weights of the machine learning module may be updated. The process 700 may proceed back to block 725 after the machine learning model has been updated. If the machine learning model is trained, the process 700 ends. Blocks 725 and 730 may be repeated until the machine learning model has been trained.

The process 700 illustrates a supervised learning method. However, it can be appreciated that other machine learning algorithms (such as reinforcement learning) can be used in conjunction of the present disclosure for implementing the process 700. In some embodiments, the process 700 may be performed offline. For example, the process 700 may be performed before the machine learning model is deployed in a vehicle or may be performed to update a machine learning model that was previously trained and/or deployed. In another example, the process 700 may be performed while the machine learning model is not connected to or deployed within a vehicle.

Figure 7:
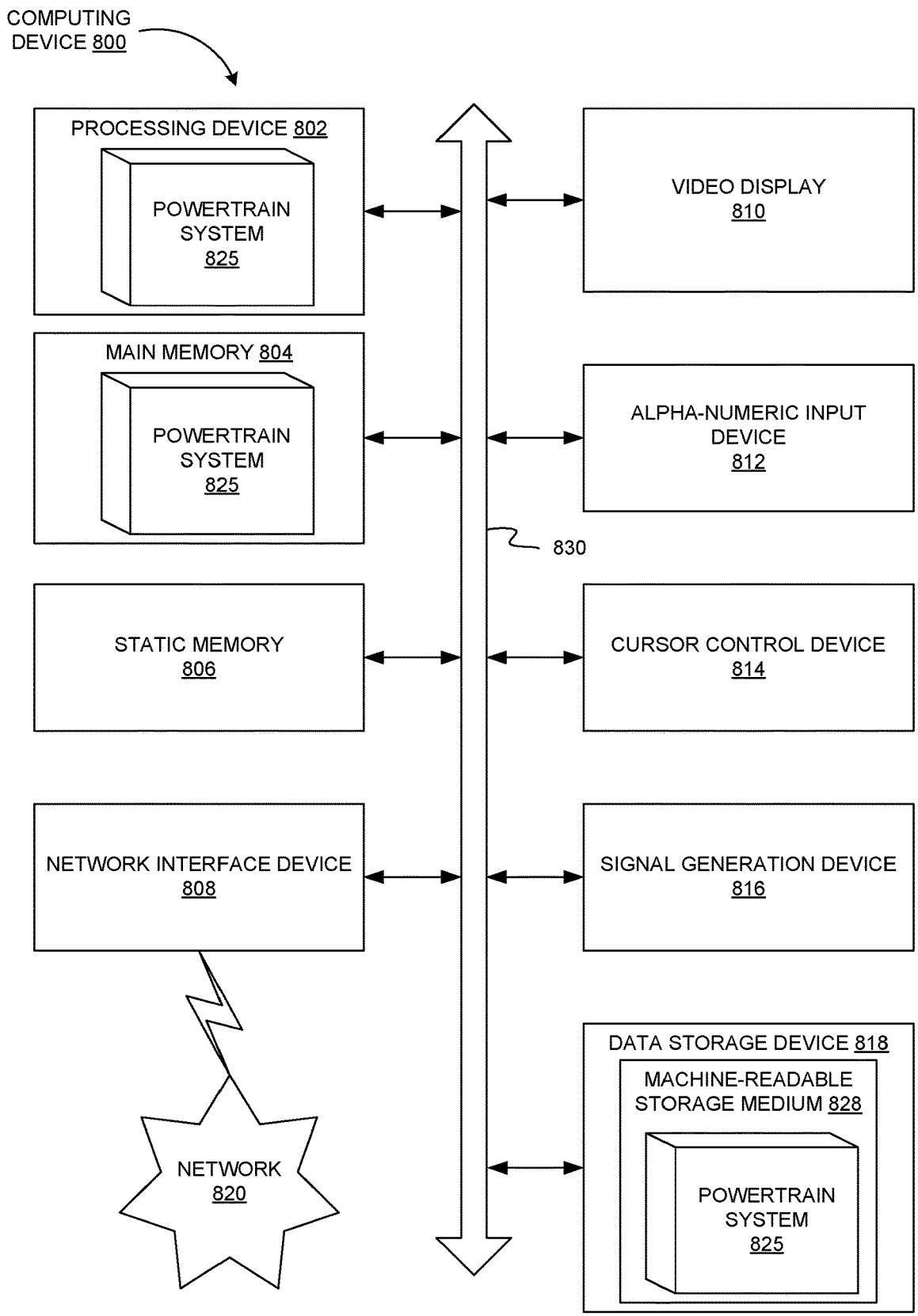
FIG. 7 is a block diagram illustrating an example computing device, in accordance with one or more embodiments of the present disclosure.

FIG. 7 is a block diagram of an example computing device 800, in accordance with some embodiments. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a programmable logic device (PLD), etc.) 802, a main memory 804 (e.g., synchronous dynamic random access memory (DRAM), read-only memory (ROM)), a static memory 806 (e.g., flash memory), and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of powertrain system instructions 825, e.g., instructions for carrying out the operations described herein, in accordance with one or more aspects of the present disclosure. Powertrain system instructions 825 may also reside, completely or at least partially, within main memory 804 and/or within processing device 802 during execution thereof by computing device 800, main memory 804 and processing device 802 also constituting computer-readable media. The powertrain system instructions 825 may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Although the present disclosure may refer to machine learning models, such as neural network, other types of machine learning and artificial intelligence systems may be used. For example, support vector machines, boosting, etc., may be used in other embodiments.

Unless specifically stated otherwise, terms such as "controlling," "determining," "providing," "generating," "indicating," "obtaining," "coupling," "receiving," "causing," "training," "updating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   receiving a power request for a vehicle, wherein:
      the vehicle comprises one or more power sources; and
      each power source of the one or more power sources is configured to provide power for moving the vehicle;
   obtaining perception data generated by a perception system of the vehicle;
   determining one or more health values for the one or more power sources;
   determining, by a powertrain supervisor, a power distribution based on the power request, a set of perception data, vehicle state information, and a machine learning model, wherein:
      the set of perception data comprises data indicating one or more of an environment where the vehicle is currently located and objects within the environment;
      the power request, the set of perception data, and the one or more health values are provided as an input to the machine learning model; and
      the power distribution is generated by the machine learning model and the power distribution reduces degradation to one or more healths of the one or more power sources when compared with another power distribution; and
   providing the power distribution to a powertrain controller, wherein:
      the powertrain controller is configured to control the one or more power sources for the vehicle based on the power distribution; and
      the powertrain supervisor is communicatively coupled to the perception system.

2. The method of claim 1, wherein each of the one or more health values indicates one or more of a current health of a respective power source and a degradation to the current health of the respective power source.

3. The method of claim 1, wherein:
   each of the one or more health values is determined based on a respective health module; and
   each health module comprises a respective machine learning model.

4. The method of claim 3, wherein:
   a first power source of the one or more power sources comprises a fuel cell;
   the first power source is associated with a first health module; and
   data generated by components associated with the fuel cell are provided as input to the first health module.

5. The method of claim 3, wherein:
   a first power source of the one or more power sources comprises a battery;
   the first power source is associated with a first health module; and
   data generated by components associated with the battery are provided as input to the first health module.

6. The method of claim 1, wherein the one or more health values are determined while the vehicle is in operation.

7. The method of claim 1, wherein the power distribution is further determined based on one or more power preferences.

8. The method of claim 1, wherein the power distribution indicates an amount of power for each of the one or more power sources.

9. The method of claim 8, wherein the powertrain controller is configured to cause each of the one or more power sources to generate a respective amount of power indicated by the power distribution.

10. The method of claim 1, wherein the machine learning model is trained based on a set of training data and a set of reference power distributions.

11. The method of claim 10, wherein the set of reference power distributions are generated based on one or more of a set of reference drive cycles and a set of reference velocity profiles.

12. The method of claim 10, wherein:
   wherein the power distribution is determined further based on a vehicle state and
   wherein the vehicle state is determined based on one or more other systems of the vehicle.

13. The method of claim 1, wherein:
   the power distribution is determined further based on communication data received from a communication system; and
   the communication system is communicatively coupled to the powertrain supervisor.

14. The method of claim 1, wherein the perception system comprises a navigation system, and the set of perception data comprises one or more of location data and a route for the vehicle.

15. An apparatus, comprising
   a memory configured to store data; and
   a processing device coupled to the memory, the processing device configured to:
      receive a power request for a vehicle, wherein:
         the vehicle comprises one or more power sources; and each power source of the one or more power sources is configured to provide power for moving the vehicle;

obtain perception data generated by a perception system of the vehicle;

determine one or more health values for the one or more power sources;

determine, by a powertrain supervisor, a power distribution based on the power request, a set of perception data, vehicle state information, and a machine learning model, wherein:

the set of perception data comprises data indicating one or more of an environment where the vehicle is currently located and objects within the environment;

the power request, the set of perception data, and the one or more health values are provided as an input to the machine learning model; and the power distribution is generated by the machine learning model and the power distribution reduces degradation to one or more healths of the one or more power sources when compared with another power distribution; and provide the power distribution to a powertrain controller, wherein:

the powertrain controller is configured to control the one or more power sources for the vehicle based on the power distribution; and the powertrain supervisor is communicatively coupled to the perception system.

16. The apparatus of claim 15, wherein each of the one or more health values indicates one or more of a current health of a respective power source and a degradation to the current health of the respective power source.

17. The apparatus of claim 15, wherein:

each of the one or more health values is determined based on a respective health module; and each health module comprises a respective machine learning model.

18. The apparatus of claim 15, wherein the one or more health values are determined while the vehicle is in operation.

19. The apparatus of claim 15, wherein the power distribution indicates an amount of power for each of the one or more power sources.

20. A non-transitory computer-readable storage medium including instructions that, when executed by a processing device, cause the processing device to:

receive a power request for a vehicle, wherein:

the vehicle comprises one or more power sources; and each power source of the one or more power sources is configured to provide power for moving the vehicle;

obtain perception data generated by a perception system of the vehicle;

determine one or more health values for the one or more power sources; determine, by a powertrain supervisor, a power distribution based on the power request, a set of perception data, vehicle state information, and a machine learning model, wherein:

the set of perception data comprises data indicating one or more of an environment where the vehicle is currently located and objects within the environment;

the power request, the set of perception data, and the one or more health values are provided as an input to the machine learning model; and the power distribution is generated by the machine learning model and the power distribution reduces degradation to one or more healths of the one or more power sources when compared with another power distribution; and provide the power distribution to a powertrain controller, wherein:

the powertrain controller is configured to control the one or more power sources for the vehicle based on the power distribution; and the powertrain supervisor is communicatively coupled to the perception system.

* * * * *